United States Patent
Takeuchi

(10) Patent No.: US 7,876,062 B2
(45) Date of Patent: Jan. 25, 2011

(54) BRUSHLESS ELECTRIC MACHINE AND APPARATUS USING THE SAME

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 225 days.

(21) Appl. No.: 12/206,912

(22) Filed: Sep. 9, 2008

(65) Prior Publication Data

US 2009/0066275 A1 Mar. 12, 2009

(30) Foreign Application Priority Data

Sep. 12, 2007 (JP) ............................. 2007-236326

(51) Int. Cl.
*H02P 6/00* (2006.01)
*H02K 17/44* (2006.01)

(52) U.S. Cl. ........................... 318/400.01; 318/400.42; 318/687; 310/112

(58) Field of Classification Search ................. 318/687, 318/38, 135, 400.01, 400.42; 310/156.43, 310/154.28, 154.29, 12.18, 12.21, 12.22, 310/12.24, 12.25, 12.26, 12.28, 112, 114, 310/266

See application file for complete search history.

(56) References Cited

U.S. PATENT DOCUMENTS

| | | | | |
|---|---|---|---|---|
| 4,536,690 A | * | 8/1985 | Belsterling et al. | 318/687 |
| 4,908,533 A | * | 3/1990 | Karita et al. | 310/12.28 |
| 7,615,894 B1 | * | 11/2009 | Deal | 310/14 |
| 2006/0017884 A1 | * | 1/2006 | Goodhill et al. | 352/184 |
| 2006/0213703 A1 | * | 9/2006 | Long | 180/65.2 |
| 2007/0234552 A1 | * | 10/2007 | Nozawa et al. | 29/596 |
| 2009/0085412 A1 | * | 4/2009 | Takeuchi | 310/12 |
| 2010/0068581 A1 | * | 3/2010 | Jufuku | 429/26 |

FOREIGN PATENT DOCUMENTS

| | | |
|---|---|---|
| JP | 56-120785 | 9/1981 |
| JP | 5-84688 | 4/1993 |
| JP | 2001-298982 | 10/2001 |

* cited by examiner

*Primary Examiner*—Walter Benson
*Assistant Examiner*—Eduardo Colon
(74) *Attorney, Agent, or Firm*—Harness, Dickey & Pierce, P.L.C.

(57) ABSTRACT

A first member has a magnet assembly that includes at least one permanent magnet pair, and a second member includes an electromagnetic coil. A control circuit controls the supply of power to the electromagnetic coil as well as regeneration of power from the electromagnetic coil. The permanent magnet pair generates its strongest magnetic field along a magnetic field direction on homopolar contact planes where first magnetic poles contact one another, outward from the center of the permanent magnet pair along the magnetic field direction. The electromagnetic coil is positioned such that current will flow in a direction intersecting the magnetic field direction.

15 Claims, 15 Drawing Sheets

BRUSHLESS ELECTRIC MACHINE AND APPARATUS USING THE SAME

CROSS-REFERENCE TO RELATED APPLICATIONS

The present application claims the priority based on Japanese Patent Application No. 2007-236326 filed on Sep. 12, 2007, the disclosure of which is hereby incorporated by reference in its entirety.

BACKGROUND OF THE INVENTION

1. Field of the Invention

The present invention relates to a brushless electric machine and an apparatus using the same, and particularly to a brushless electric machine that utilizes permanent magnets and a magnet coil.

2. Description of the Related Art

The term "brushless electric machine" refers to both brushless motors and brushless generators. Known brushless motors include that disclosed in JP-A-2001-298982, for example.

In conventional brushless electric machines, operation is controlled through appropriate switching of the direction of the electric current applied to the coil, or the direction of the regenerative current. However, the controller circuitry for carrying out switching of current direction is complex in design, and loss associated with switching operations has been a problem.

SUMMARY OF THE INVENTION

An object of the present invention is to provide a brushless electric machine that affords a simpler controller circuit design and good efficiency.

According to an aspect of the present invention, there is provided a brushless electric machine. The brushless electric machine includes a first member with a magnet assembly that includes at least one permanent magnet pair, and a second member including a electromagnetic coil such that the first and second members are changeable in position relative to one another. Each magnet of the magnet pair has a first magnetic pole and a second magnetic pole, and the two magnets of each magnet pair are held such that the first magnetic poles contact one another. The permanent magnet pair generates strongest magnetic field along a magnetic field direction lying in a homopolar contact plane at which the first magnetic poles contact one another, and outward from a center of the permanent magnet pair along the magnetic field direction. The electromagnetic coil is positioned such that current will flow in a direction intersecting the magnetic field direction. A control circuit controls supply of to the electromagnetic coil or regeneration of power from the electromagnetic coil. The control circuit performs at least one of drive control and regeneration control. In the drive control, the control circuit operates the brushless electric machine in a prescribed driving direction, by supplying the electromagnetic coil with driving current in a prescribed first current direction without changing the direction of current supplied to the electromagnetic coil. In the regeneration control, the control circuit regenerates DC power generated by the coil caused by relative movement of the first and second members along a prescribed direction.

This brushless electric machine performs drive control or regeneration control without switching of the direction of the current or voltage, and therefore an efficient brushless electric machine will be attained with a simple controller circuit design.

The present invention may be embodied in various other modes, such as an electric motor, a generator, a method for controlling the same, an actuator, or various apparatuses such as an electronic device, a robot, and a moving body employing the same.

DESCRIPTION OF THE PREFERRED EMBODIMENT

Figure 1A:
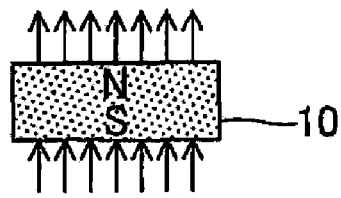
FIGS. 1A-1D illustrate magnet assemblies utilized in the embodiments of the invention.
Figure 1B:
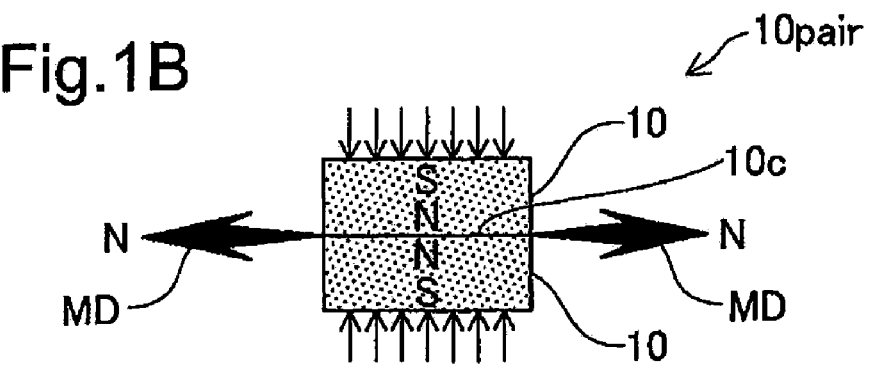

The preferred modes for carrying out the invention will be described below, in the following order A. Magnet Assembly Configuration
B. Various Embodiments
C. Circuit Configuration
D. Modification Examples A. Magnet Assembly Configuration FIGS. 1A-1D illustrate magnet assemblies utilized in the embodiments of the invention. FIG. 1A depicts a single permanent magnet 10. This magnet 10 has been magnetized in the vertical direction. The arrows exiting from the N pole and the arrows entering at the S pole represent the lines of magnetic force. FIG. 1B depicts a permanent magnet pair 10 pair composed of two magnets 10. In this permanent magnet pair 10 pair, the two magnets 10 are held contacting one another at their N poles. When the two magnets 10 are held in this state, the strongest magnetic field will be generated along a magnetic field direction MD oriented outward from the homopolar contact plane 10c as depicted by the heavy arrows. Here, the "homopolar contact plane" refers to a plane defined by the surfaces of the homopoles contacting one another. The magnetic field direction MD is a direction lying in the homopolar contact plane 10c and extending outwardly from the center of the permanent magnet pair 10 pair. Where the magnets 10 are small in size, this magnetic field direction MD will be a radial direction oriented outward from the center of the permanent magnet pair 10 pair. Experiments conducted by the inventors have shown that surface magnetic flux density in the magnetic field direction MD of the permanent magnet pair 10 pair reaches approximately double the surface magnetic flux density of a single magnet 10 (i.e. magnetic flux density at the upper face in FIG. 1A). Accordingly, in the embodiments of the present invention, motors or generators are designed using such permanent magnet pairs 10 pair so as to utilize their intense magnetic fields in the magnetic field direction MD. The permanent magnet pairs 10 pair may also be designed to contact each other at their S poles rather than their N poles.

Figure 1C:
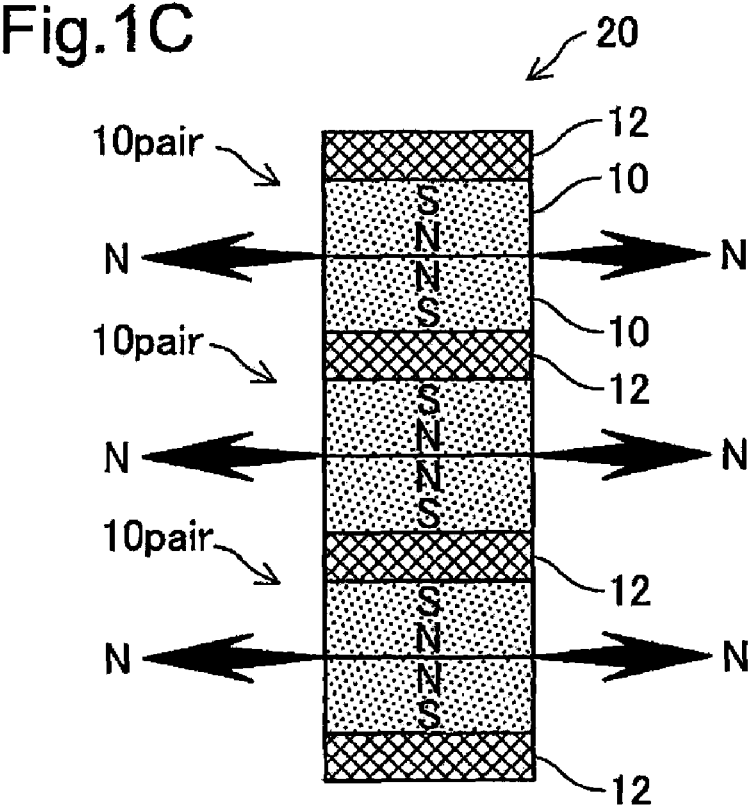
Figure 1D:
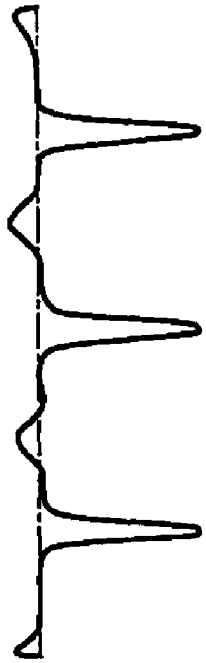

FIG. 1C depicts a magnet assembly 20 that includes three permanent magnet pairs 10 pair. At two edges of each of the three permanent magnet pairs 10 pair there are respectively disposed electromagnetic yoke members 12. Specifically, the electromagnetic yoke members 12 are respectively disposed in contact with the S pole of each permanent magnet pair 10 pair. It is possible for the electromagnetic yoke members 12 to be made of ferromagnetic material; in particular, it is preferable for them to be made of material with high magnetic permeability such as permalloy. FIG. 1D depicts a distribution of surface magnetic flux density of the magnet assembly 20. As will be understood from the graph, the electromagnetic yoke members 12 have the effect of reducing surface magnetic flux density at the S poles. As a result, in the area surrounding the magnet assembly 20 (locations to left and right in FIG. 1C) there will be produced a characteristic magnetic field in which surface magnetic flux density is high in proximity the N poles and surface magnetic flux density is low in proximity the S poles. The embodiments discussed hereinbelow employ a magnet assembly that generates this kind of characteristic magnetic field.

It is possible to employ as the magnet assembly any design having at least one permanent magnet pair 10 pair. While it is acceptable for the magnet assembly to lack electromagnetic yoke members as depicted in FIG. 1B, in preferred practice electromagnetic yoke members 12 will be included at second magnetic poles (the S poles in the example of FIG. 1) that are different from first magnetic poles (the N poles) and that contact one another, as depicted in FIG. 1C. The reason is that by doing this the magnetic field in proximity to the first magnetic poles (N poles) can be utilized effectively, while preventing any reduction in efficiency caused by the effects of the magnetic field in proximity to the second magnetic poles (S poles).

B. Various Embodiments

Figure 2A:
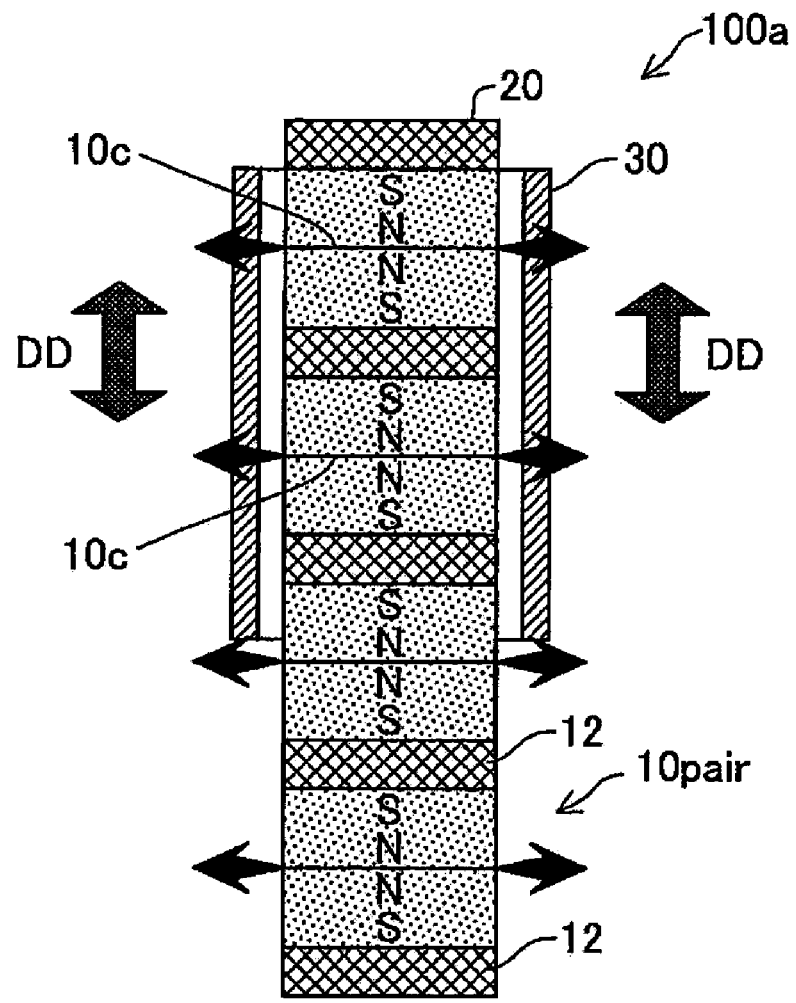
FIGS. 2A and 2B are sectional views depicting a linear motor according to a first embodiment.
Figure 2B:
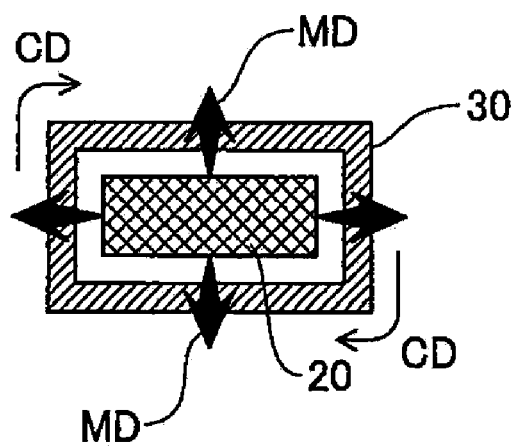

FIG. 2A is a longitudinal sectional view depicting a configuration of a brushless linear motor according to a first embodiment. This linear motor 100a has a first member that includes the magnet assembly 20, and a second member that includes an electromagnetic coil 30, wherein the first and second members move relative to each other. In this example, the magnet assembly 20 has four permanent magnet pairs 10 pair. Electromagnetic yoke members 12 have been disposed on all of the S poles. FIG. 2B is a horizontal sectional view of the linear motor 100a. The magnetic field direction MD in proximity to the N pole extends in a radial pattern towards the outside from the center of the magnet assembly 20. In FIG. 2B, when electrical current flows along the current direction CD in the electromagnetic coil 30, drive power will act on the electromagnetic coil 30 in the direction going from back to front in the plane of the page. In cases where the electromagnetic coil 30 is stationary, the magnet assembly 20 will be driven in the direction going from back to front in the plane of the page in FIG. 2B. When the current direction is reversed, drive power in the opposite direction will be generated. In the brushless linear motor 100a, DC current flowing the electromagnetic coil 30 will move the magnet assembly 20 in this way along the driving direction DD (the vertical direction) in FIG. 2A.

The electromagnetic coil 30 will preferably be arranged in a range in the driving direction DD which covers at least a distance spanning two or more homopolar contact planes 10c (i.e. at least the pitch of the homopolar contact planes 10c), as depicted in FIG. 2A. The reason is that, as depicted in FIG. 1D, the magnetic flux density distribution is strongest at the locations of the homopolar contact planes 10c, and weaker at other locations. Specifically, where the electromagnetic coil 30 is arranged in a range at least equal to the pitch of the homopolar contact planes 10c it will be possible to generate large drive power while consistently utilizing the strong magnetic field in proximity to the homopolar contact planes 10c. If on the other hand the electromagnetic coil 30 is arranged in a range shorter than the pitch of the homopolar contact planes 10c, it is possible that inability to initiate movement may occur, depending on the location of the motor when stopped. For similar reasons, it is preferable for the pitch of the homopolar contact planes 10c to be constant throughout the motor.

In the example of FIG. 2B, the magnet assembly 20 has an oblong shape in horizontal sectional view, but it is possible to employ any other shapes, such as circular or triangular, as the shape of the horizontal cross section of the magnet assembly 20. However, it is preferable for the individual magnets 10 that make up the magnet assembly 20 to have a plate shape with a small distance between magnetic poles (i.e. thickness) rather than a bar shape with a large distance between magnetic poles. The reason is that in the electric machine using the magnet assembly 20, the strong magnetic field generated at the homopolar contact planes 10c will be utilized, so thinner magnets 10 afford better efficiency. In this sense, it is preferable for the direction of magnetization of the magnets to be aligned with the direction of the smallest thickness.

Figure 3A:
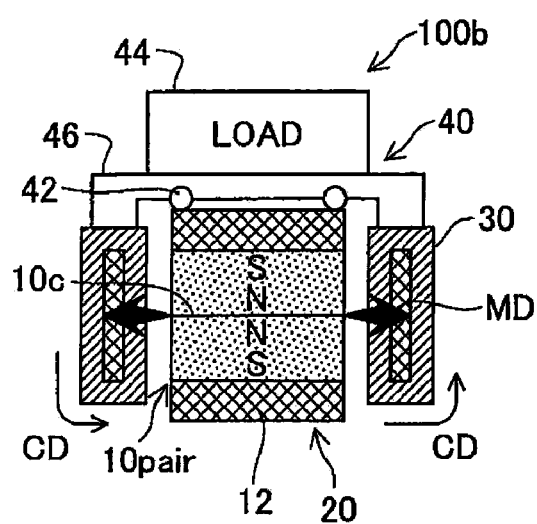
FIGS. 3A and 3B illustrate a linear motor according to a second embodiment.
Figure 3B:
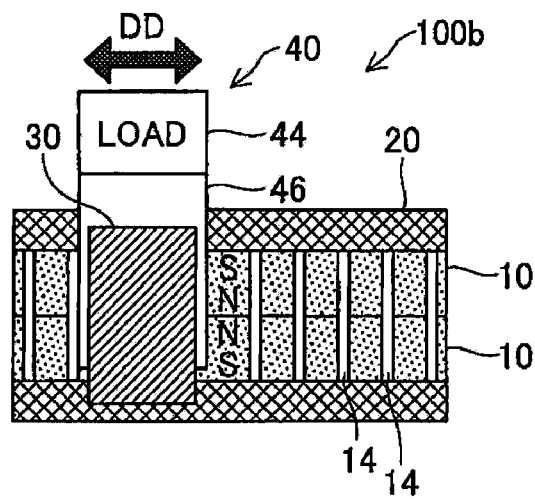

FIG. 3A is a longitudinal sectional view depicting a configuration of a brushless linear motor according to a second embodiment; and FIG. 3B is a side view. This linear motor 100b has a first member that includes the magnet assembly 20, and a second member 40 that includes the electromagnetic coil 30. The electromagnetic coil 30 is supported on a frame (frame member) 46; a load portion 44 rests on the frame 46. The load portion 44 is a physical object that moves together with the frame 46, and it may include a power supply (e.g. a battery) and a controller circuit of the electromagnetic coil 30. The frame 46 is retained on top of the magnet assembly 20 via a bearing 42. When DC current flows to the electromagnetic coil 30, the member 40, inclusive of the electromagnetic coil 30 and the frame 46, will move in a perpendicular direction to the plane of the page of FIG. 3A. This driving direction corresponds to the driving direction DD shown in FIG. 3B.

In the event that current has flowed in the current direction CD shown in FIG. 3A, the member 40 will be driven in the direction going from back to front in the plane of the page of FIG. 3A. With the configuration of FIG. 3A, of the coil sections of the electromagnetic coil 30, drive power will be generated in opposite directions in those coil sections closer to the permanent magnet pair 10 pair versus those coil sections further away. However, since magnetic flux density of the permanent magnet pairs 10 pair declines sharply in sections further away from the permanent magnet pairs 10 pair, the drive power in the opposite direction generated in coil sections further away from the permanent magnet pair 10 pair will not be of an extent that poses any practical problems.

In the example of FIGS. 3A and 3B, the magnet assembly 20 is composed of a single permanent magnet pair 10 pair, and electromagnetic yoke members 12 are disposed at its upper end and lower end. As depicted in FIG. 3B, this magnet assembly 20 is a magnet whose largest dimension is that in the driving direction DD. Consequently, with this linear motor 100b it is possible for the member 40 to be moved over a long distance in the driving direction DD. Also, as shown in FIG. 3B, a multitude of slits 14 may be provided on the surface (the side face) of the permanent magnet pair 10 pair.

Figure 4A:
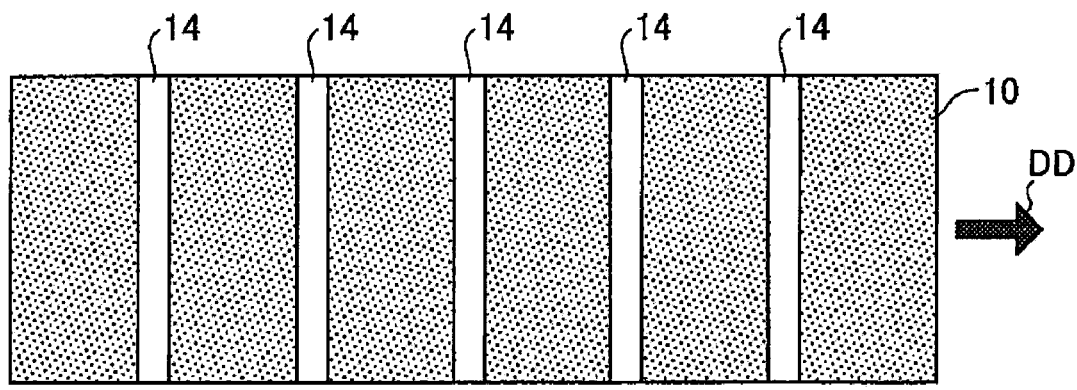
FIGS. 4A-4C illustrate examples of placement of slits of a magnet.
Figure 4B:
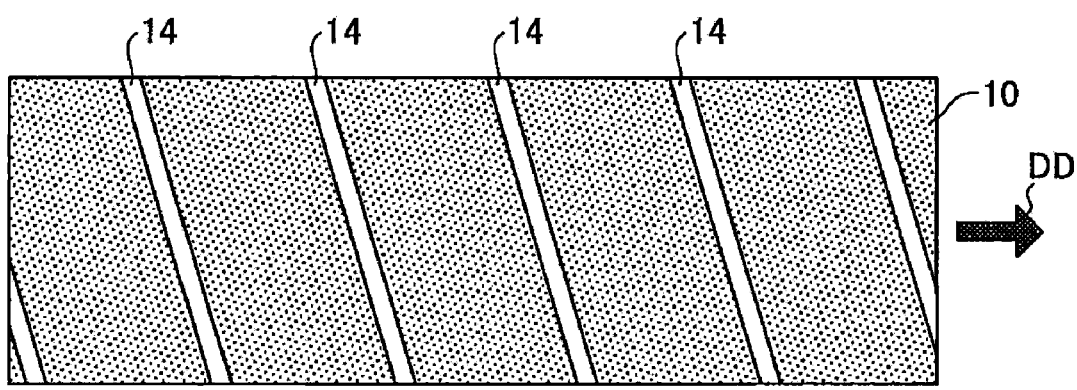
Figure 4C:
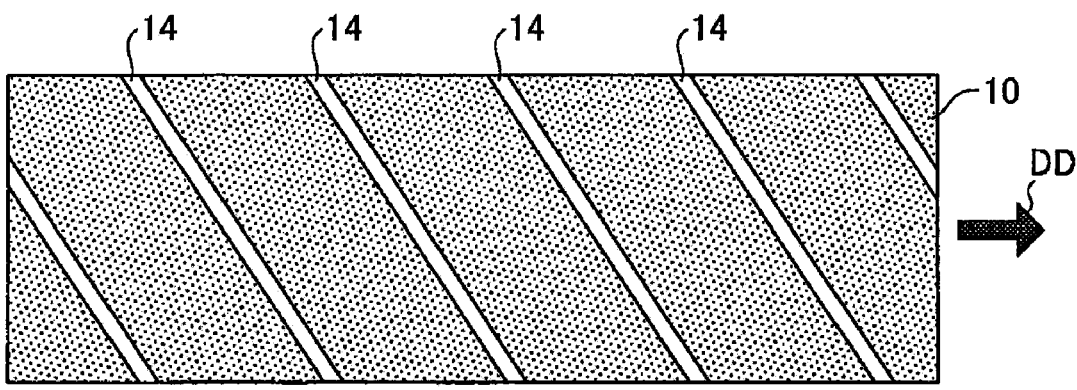

FIGS. 4A-4C are illustrations depicting examples of placement of the slits 14 of the magnet 10. In the example of FIG. 4A, the slits 14 are disposed in the direction orthogonal to the driving direction DD. In the examples of FIGS. 4B and 4C, the slits 14 are disposed in a direction inclined from either side and from the direction orthogonal to the driving direction DD. As will be understood from these examples, it is preferable for the slits 14 to be disposed in a direction intersecting the driving direction DD. The reason for this is as follows. It is known that in general, for an infinitely large plate-shaped magnet that has been magnetized in the thickness direction, magnetic flux density will be zero. A similar phenomenon may be observed with plate-shaped magnets of sufficiently large size. Accordingly, by providing slits 14 in the surface of a permanent magnet (specifically, the surface facing the electromagnetic coil) it will be possible to increase the magnetic flux density, and as a result to increase the drive power. In preferred practice, such slits 14 will be provided in the other embodiments as well.

In the examples depicted in FIGS. 4A-4C the permanent magnet is provided with slits; however, it is also acceptable for the permanent magnet to be physically divided at the locations of the slits. It should be appreciated that the effect in this case will be that of a plurality of small permanent magnets are arranged in row with gaps between them. Both the gaps in this case and the slits depicted in FIGS. 4A-4C can be understood to correspond to the "recessed portions" provided to the permanent magnet. A similar effect can be achieved by providing the permanent magnet with salient portions in place of recessed portions. It is possible for permanent magnet having such recessed portions or salient portions disposed in a direction intersecting the driving direction to be fabricated by any of a variety of methods. For example, an unmagnetized ferromagnetic member of shape identical to final magnet shape may be prepared, and the ferromagnetic member then magnetized in a magnetizing device to produce a permanent magnet like that discussed above.

In the first embodiment discussed above, current flows in a current direction CD along the homopolar contact planes 10c as depicted in FIG. 2B, whereas in the second embodiment, current flows in a current direction CD perpendicular to the homopolar contact planes 10c as depicted in FIG. 3A. However, a common concept in both cases is that the current direction CD lies orthogonal to the magnetic field direction MD on the homopolar contact planes 10c. Where the current flows orthogonal to the magnetic field direction MD on the homopolar contact planes 10c in this way, it will be possible to generate drive power efficiently. However, the current direction CD need not be orthogonal to the magnetic field direction MD on the homopolar contact planes 10c, and it is acceptable to adopt any direction that intersects the magnetic field direction MD on the homopolar contact planes 10c.

Figure 5A:
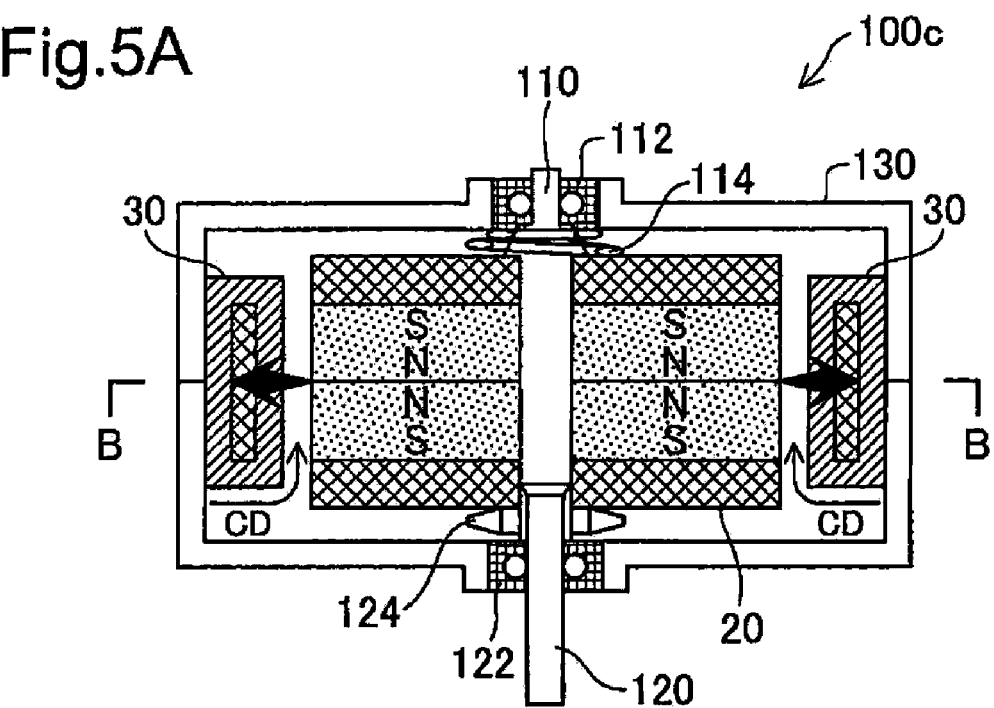
FIGS. 5A and 5B illustrate a rotary motor according to a third embodiment.
Figure 5B:
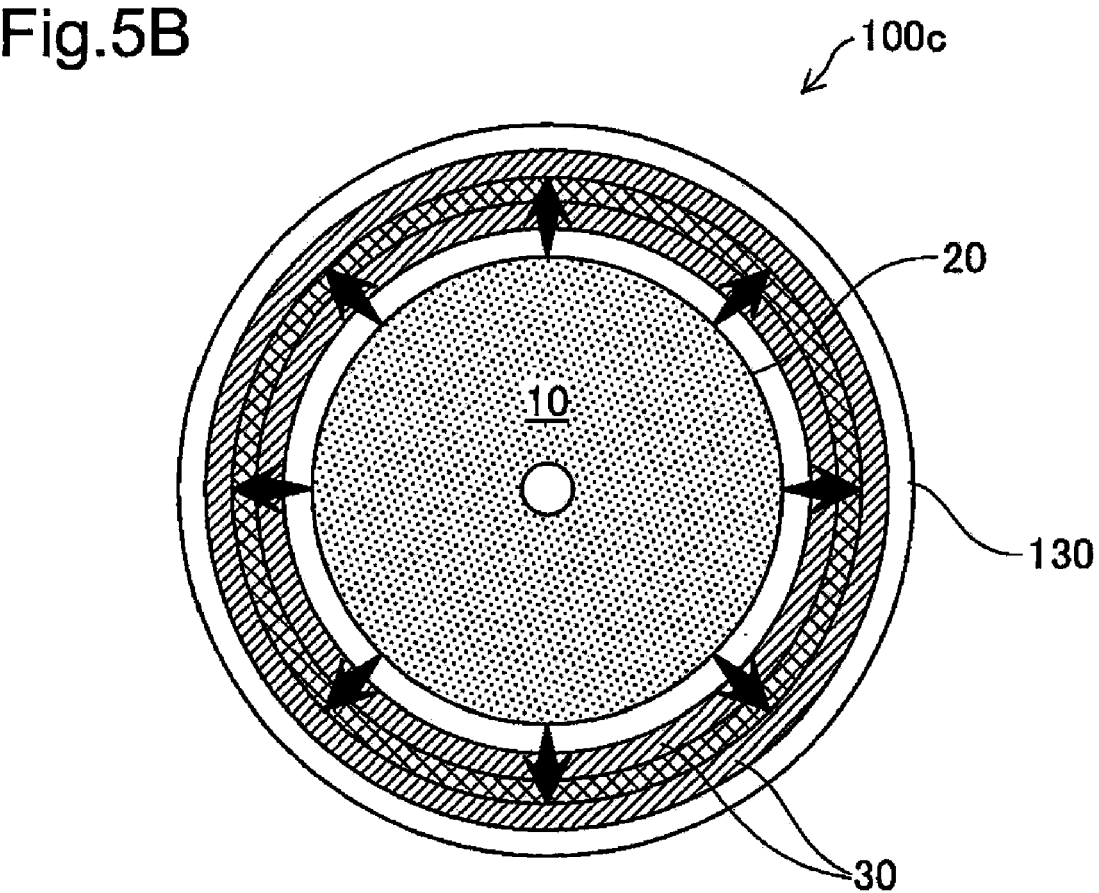

FIG. 5A is a longitudinal sectional view depicting a brushless rotary motor according to a third embodiment; and FIG. 5B is a section thereof taken along line B-B. This brushless rotary motor 100c has a rotor (first member) that includes the magnet assembly 20, and a stator (second member) that includes the electromagnetic coil 30. The electromagnetic coil 30 is affixed about the inner periphery of a casing 130. An upper shaft 110 and a lower shaft 120 of the rotor are held respectively by bearings 112, 122. The magnet assembly 20 is linked at its lower end by a fastening screw 124 to the lower shaft 120. Meanwhile, a spring 114 is disposed about the upper shaft 110 which is linked to the upper end of the magnet assembly 20, and the magnet assembly 20 is subjected to pressing force at its upper end away from the inner periphery of the casing 130 by this spring 114. However, the linking structure depicted here is merely exemplary, and it would be possible to employ various other linking structures.

The magnet assembly 20 in the third embodiment, like that in the second embodiment depicted in FIG. 3A, has a configuration that includes a single permanent magnet pair and electromagnetic yoke members disposed at either end. However, the magnet assembly 20 of the third embodiment is of disk shape, as will be understood from FIGS. 5A and 5B.

When current flows in the current direction CD shown in FIG. 5A, the rotor (the magnet assembly 20) will be driven in the clockwise direction in FIG. 5B. The current flow in the opposite direction will drive the rotor in the opposite direction. In this way, in the rotary motor of the third embodiment it is possible to bring about rotation of the rotor in a prescribed rotation direction, through the forward or reverse DC current to the electromagnetic coil 30.

Figure 6A:
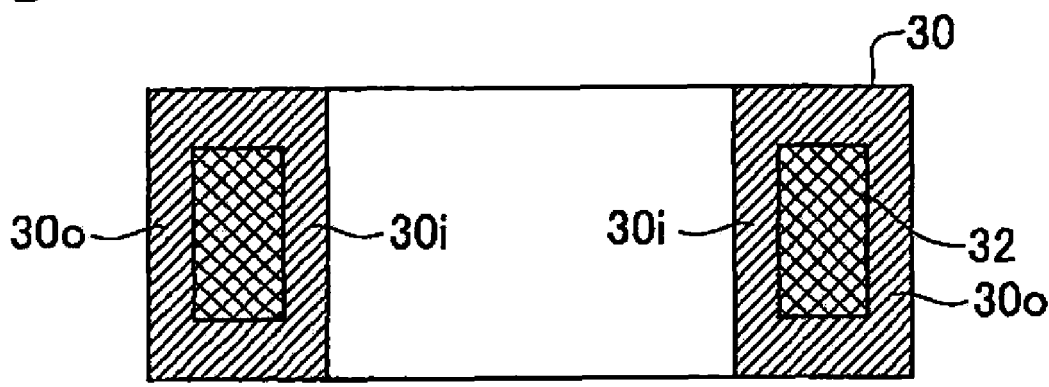
FIGS. 6A-6C illustrate in cross section electromagnetic coil structures adapted to the third embodiment.
Figure 6B:
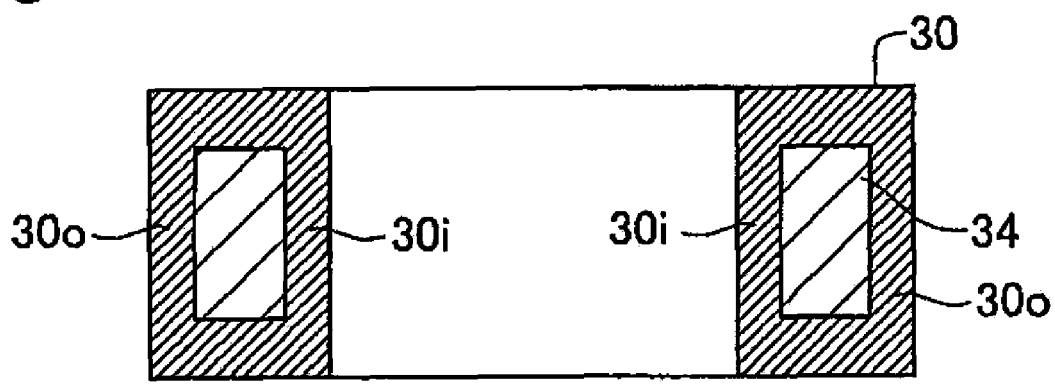
Figure 6C:
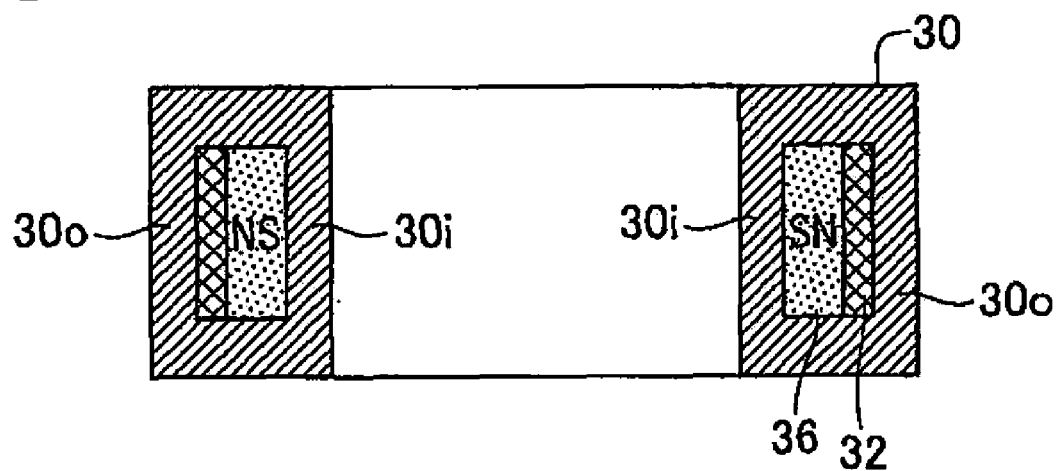

FIGS. 6A-6C are illustrations depicting in cross section electromagnetic coil structures adaptable to the third embodiment. In FIG. 6A, a ferromagnetic member 32 is provided as the core member of the coil 30. In FIG. 6B, a nonmagnetic member 34 is provided as the core member of the coil 30. In FIG. 6C, the core member of the coil 30 is composed of a permanent magnet 36 and a ferromagnetic member 32. In preferred practice, the direction of magnetization of the permanent magnet 36 core will be the same as the direction of magnetization of the homopolar contact planes 10c of the magnet assembly 20 (i.e. the lines of magnetic force will be oriented in the same direction). In FIGS. 6A-6C, a coil section 30i closer than the magnet assembly 20 and a coil section 30o further away from the magnet assembly 20 are shown as sections of the coil 30. In the designs of FIGS. 6A and 6C, in the coil section 30i closer than the magnet assembly 20, drive power is generated by the magnetic field of the magnet assembly 20, whereas in the coil section 30o further away than the magnet assembly 20, owing to the magnetic field of the magnet assembly 20 being blocked by the core members, substantially no drive power will be generated. For this reason, the designs of FIGS. 6A and 6C are preferable to the design of FIG. 6B.

Figure 7:
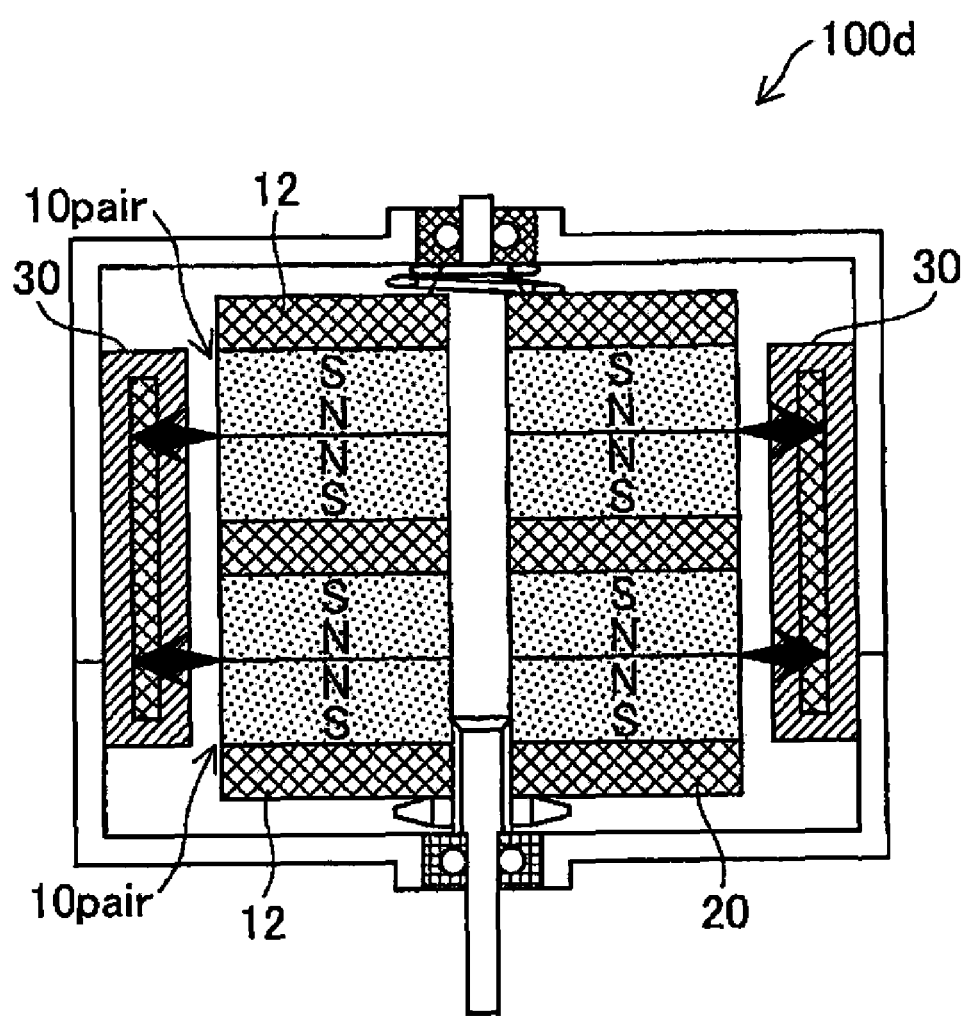
FIG. 7 is a sectional view depicting a rotary motor according to a fourth embodiment.

FIG. 7 is a longitudinal sectional view depicting a brushless rotary motor according to a fourth embodiment. This rotary motor 100d differs from that of the third embodiment in that two permanent magnet pairs 10 pair are utilized for the magnet assembly 20. Utilizing a magnet assembly 20 that has two or more permanent magnet pairs 10 pair for a rotary motor in this way, it will be possible to generate greater drive power.

Figure 8A:
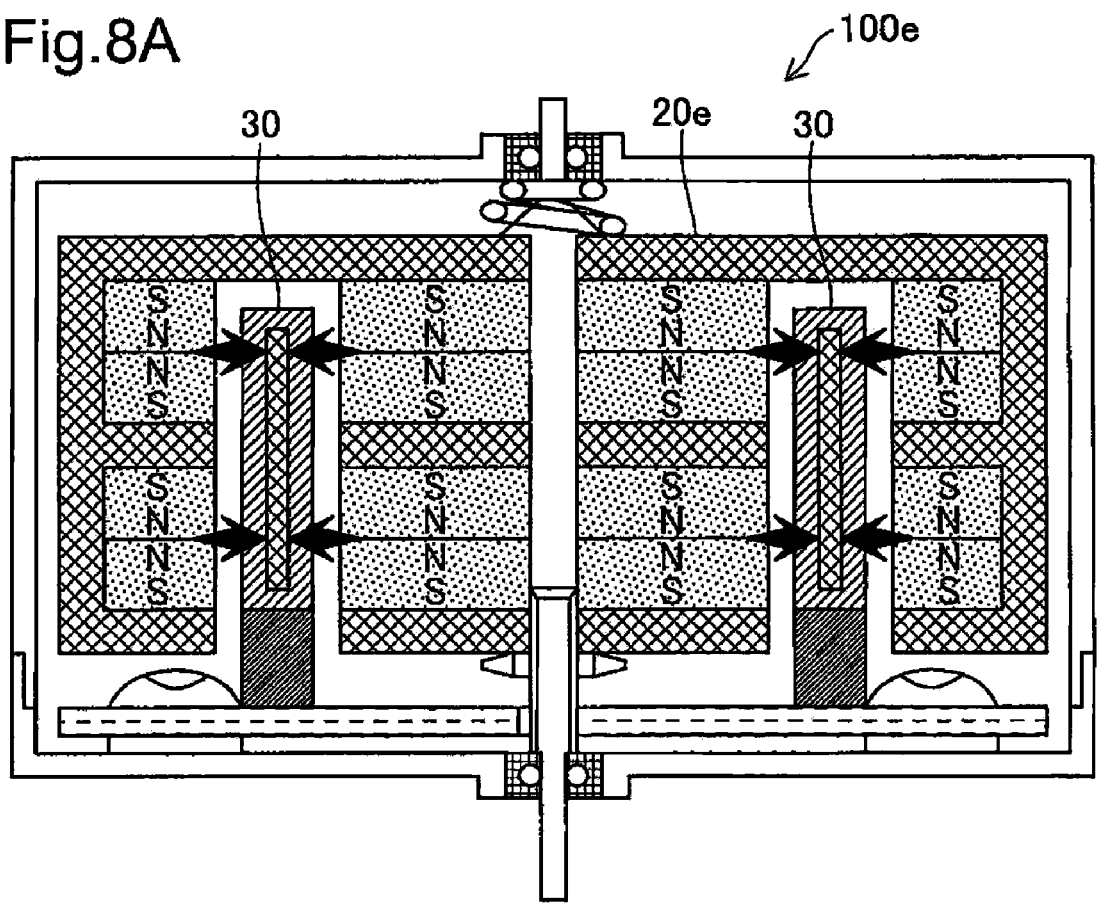
FIGS. 8A and 8B are sectional views depicting a rotary motor according to a fifth embodiment.
Figure 8B:
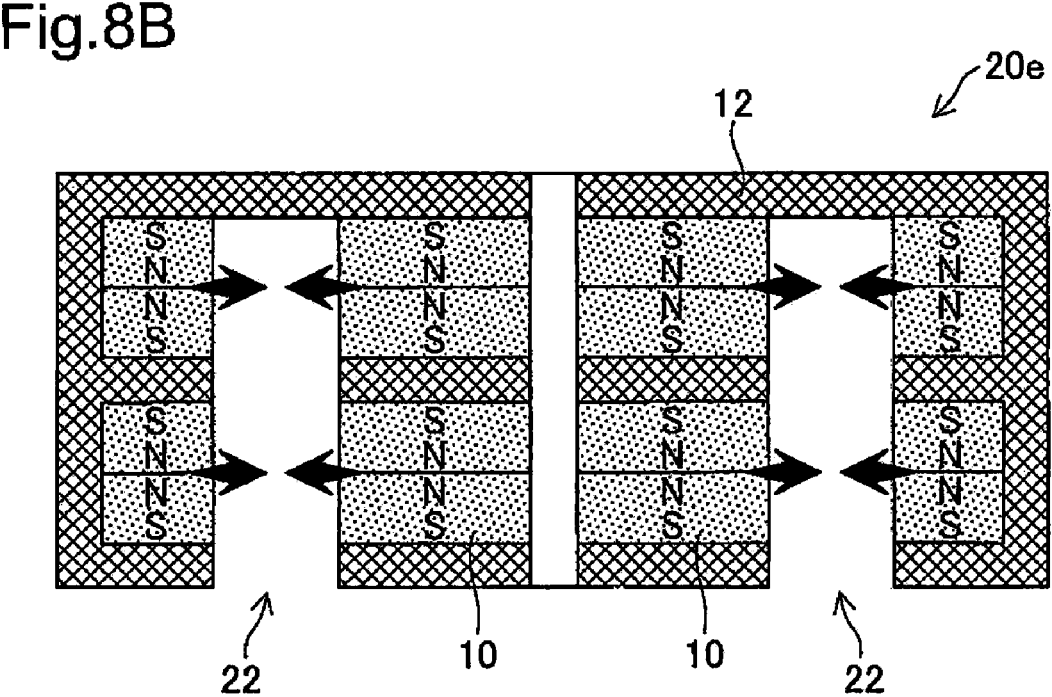

FIG. 8A is a longitudinal sectional view depicting a brushless rotary motor according to a fifth embodiment; and FIG. 8B is a longitudinal sectional view depicting a magnet assembly 20e only. As depicted in FIG. 8B, in this rotary motor 100e, the permanent magnets of the magnet assembly 20e are provided with an annular space 22 in addition to a space for the center shaft. The electromagnetic coil 30 of the stator inserts within this annular space 22. The magnet assembly 20e has a generally round cylindrical shape overall whose outside peripheral face is covered in its entirety by a electromagnetic yoke member 12. Where the magnet assembly 20e and the electromagnetic coil 30 have a configuration of this kind, as depicted in FIG. 8A, since magnetic fields of opposite directions are present to either side of the core member of the electromagnetic coil 30 it will be possible to generate drive power in the same direction from coil sections situated to either side of the electromagnetic coil 30.

Figure 9A:
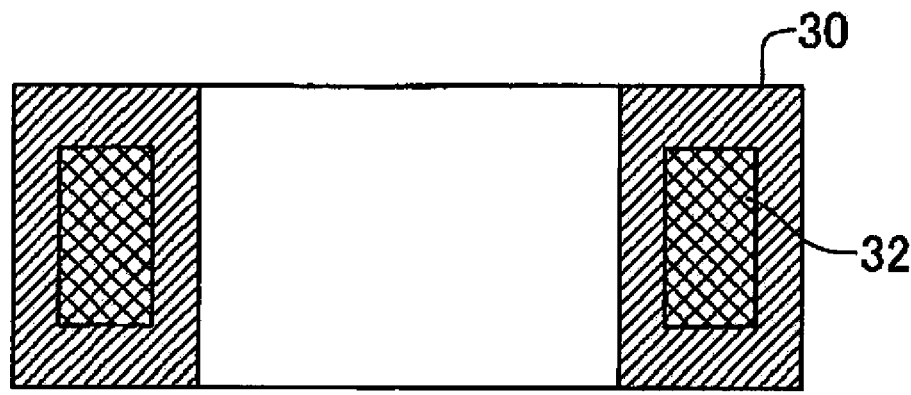
FIGS. 9A-9C illustrate in cross section electromagnetic coil structures adapted to the fifth embodiment.
Figure 9B:
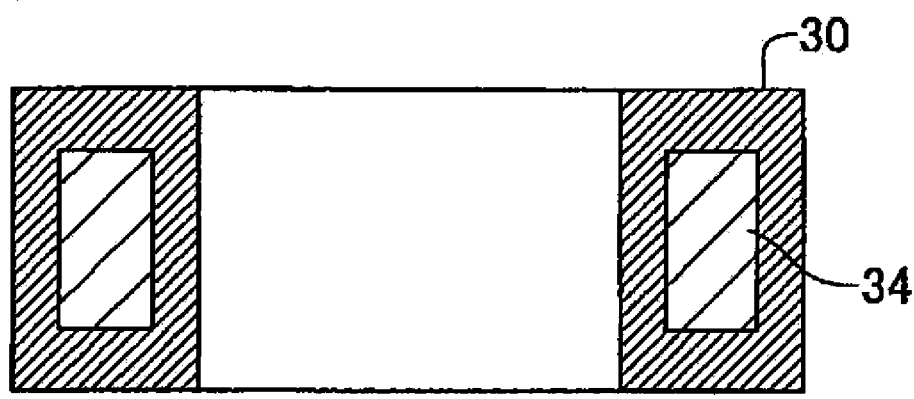
Figure 9C:
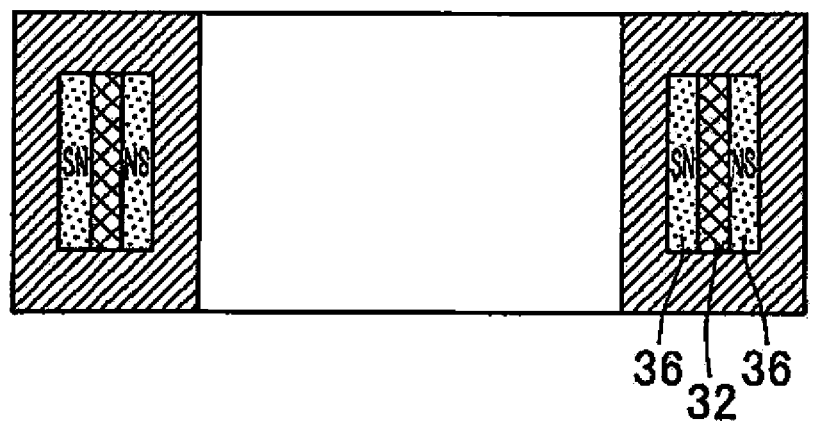

FIGS. 9A-9C are illustrations depicting in cross section electromagnetic coil structures adapted to the fifth embodiment. FIGS. 9A and 9B are identical to the designs of FIGS. 6A and 6B described previously. In FIG. 9C, the core member is composed of permanent magnets 36 disposed respectively to either side of a ferromagnetic member 32. Moreover, as in the example of FIG. 6C, the direction of magnetization of the core permanent magnets 36 will preferably be the same as the magnetic field direction on the homopolar contact planes of the magnet assembly 20e (i.e. the lines of magnetic force will be oriented in the same direction).

Figure 10:
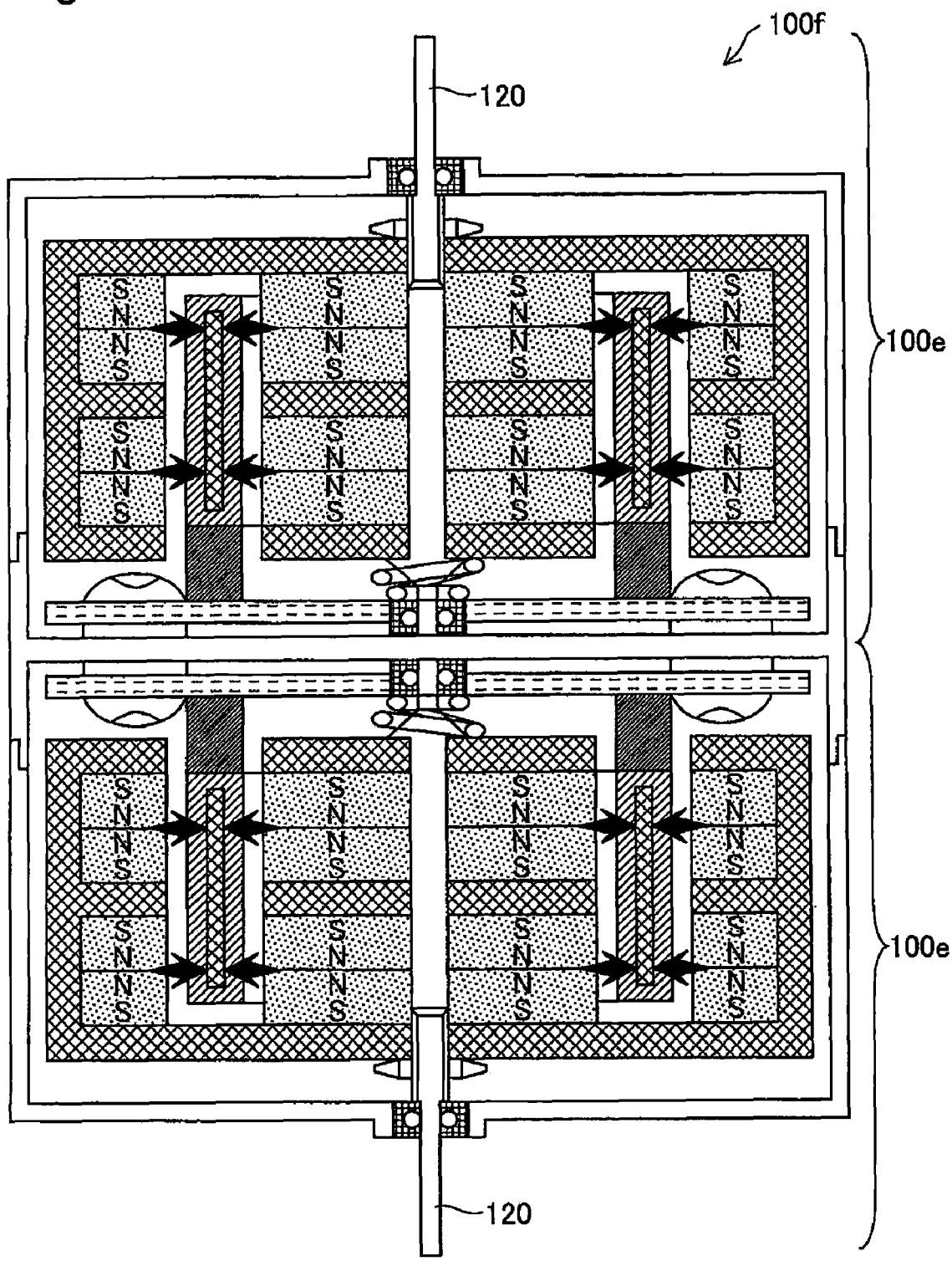
FIG. 10 is a sectional view depicting a rotary motor according to a sixth embodiment.

FIG. 10 is a longitudinal sectional view depicting a brushless rotary motor according to a sixth embodiment. This rotary motor 100f has a configuration in which two rotary motors 100e identical to those of the fifth embodiment depicted in FIG. 8A are arranged in reverse directions, and are provided with independent shafts 120 that respectively rotate independently above and below. With this rotary motor 100f, it will be possible to drive the two driven members independently by utilizing the two shafts 120.

As will be understood from the embodiments described above, it is possible for the brushless electric machines according to various aspects of the present invention to be reduced to practice in any of a number of brushless electric machines of a configuration having a first member with a magnet assembly that includes one or more permanent magnet pair, and having a second member with a coil, wherein the first and second members are capable of motion relative to one another.

C. Circuit Configuration

Figure 11:
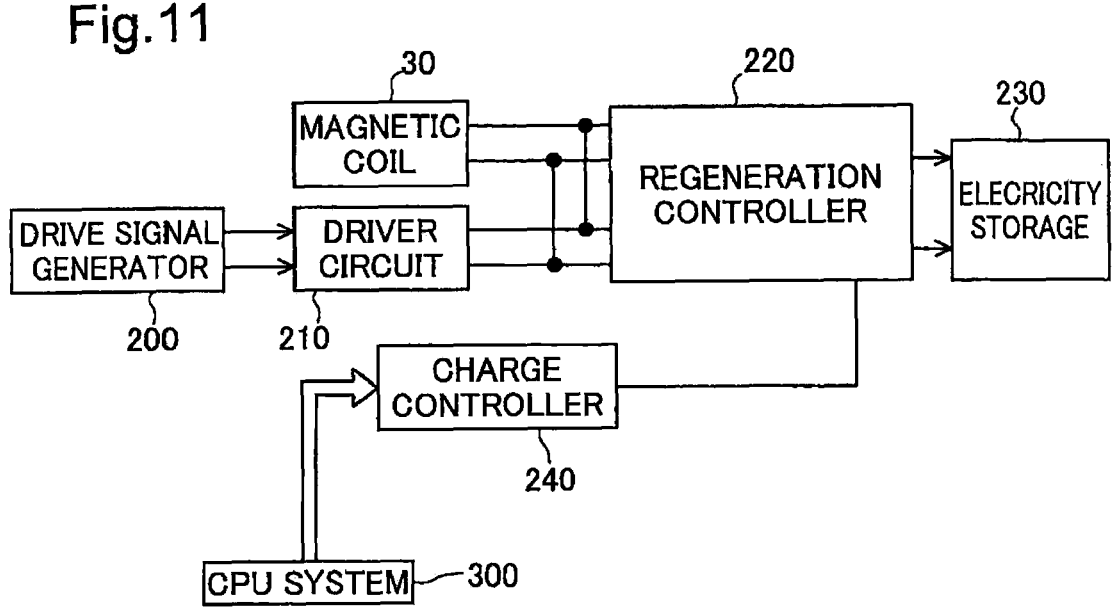
FIG. 11 is a block diagram depicting a configuration of a control circuit of a brushless electric machine.

FIG. 11 is a block diagram depicting a configuration of a control circuit of a brushless electric machine utilized in the embodiments. This control circuit includes a CPU system 300; a drive signal generator 200; a driver circuit 210; a regeneration controller 220; an electricity storage 230; and a charge controller 240. The drive signal generator 200 generates a drive signal to be supplied to the driver circuit 210.

Figure 12:
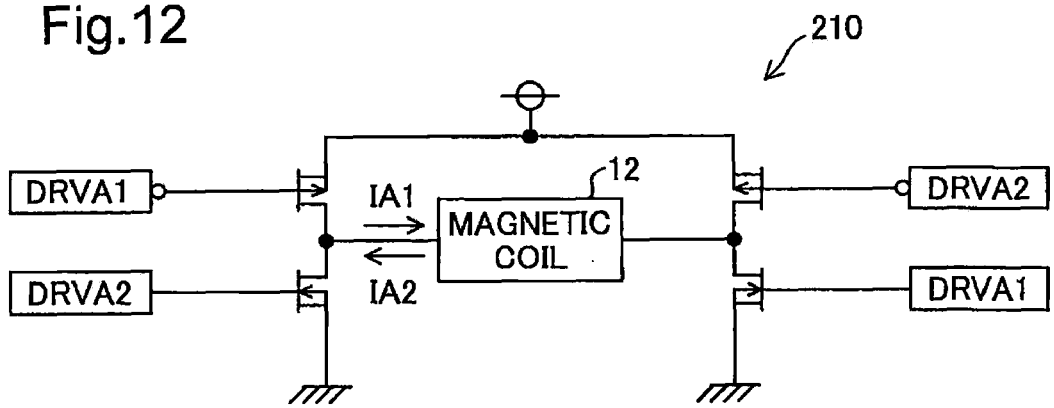
FIG. 12 is a circuit diagram depicting a configuration of a driver circuit.

FIG. 12 is a circuit diagram depicting a configuration of the driver circuit 210. This driver circuit 210 is configured as an H-bridge circuit. The driver circuit 210 is supplied with a first drive signal DRVA1 or a second drive signal DRVA2 from the drive signal generator 200. The electrical currents IA1, IA2 shown in FIG. 11 indicate the direction of current (also termed the "driving current") flowing in response to these drive signals DRVA1, DRVA2. For example, in the case of the current IA1 flowing in response to the first drive signal DRVA1 the motor will operate in a prescribed first driving direction, whereas in the case of the current IA2 flowing in response to the second drive signal DRVA2 the motor will operate in a second driving direction which is the reverse of the first driving direction. This first driving direction may be, for example, the upward direction in FIG. 2A, and the second driving direction may be the downward direction. Alternatively, in the case of a rotary motor as depicted in FIGS. 5A and 5B, the first driving direction may be the clockwise direction and the second driving direction may be the counterclockwise direction. It is possible to employ a constant On signal, a periodic pulsed signal, or the likes as the drive signals DRVA1, DRVA2.

It is also possible for the drive signal generator 200 to be configured so as to generate only one of the two drive signals DRVA1, DRVA2. In this case, the motor can be driven in one direction only, but this will be sufficient in the case of implementation as fan motors, for example.

Figure 13:
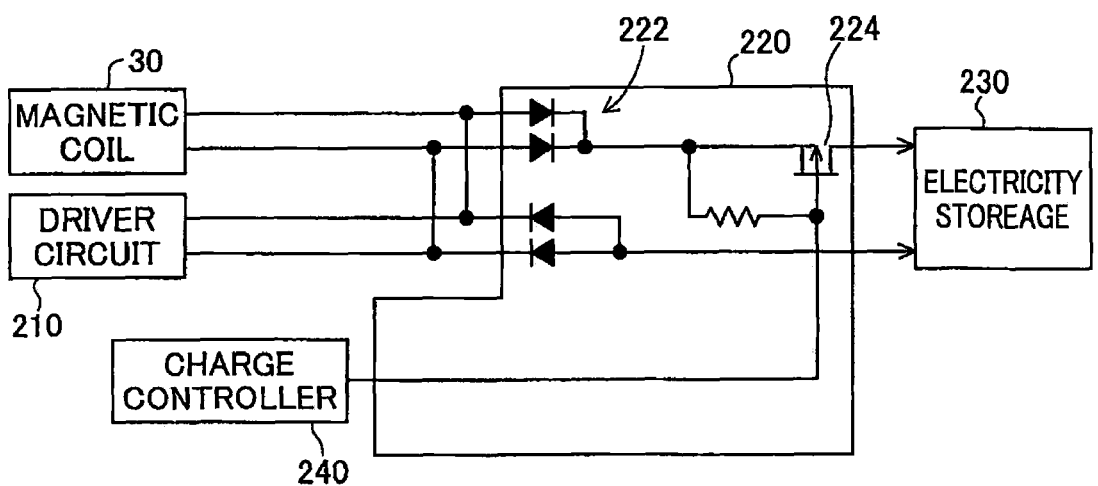
FIG. 13 is a circuit diagram depicting an internal configuration of a regeneration controller.

FIG. 13 is a circuit diagram depicting an internal configuration of the regeneration controller 220. The regeneration controller 220 is connected to the electromagnetic coil 30 in parallel with the driver circuit 210. The regeneration controller 220 includes a rectifier circuit 222 composed of diodes; and a switching transistor 224. When the switching transistor 224 is switched to the On state by the charge controller 240, it will be possible to use the power generated by the electromagnetic coil 30 to charge the electricity storage 230. It will also possible to supply the electromagnetic coil 30 with current from the electricity storage 230. The regeneration controller 220, the electricity storage 230, and the charge controller 240 are not essential to the control portion and may be dispensed with; or the drive signal generator 200 and the driver circuit 210 may be dispensed with.

In the brushless motors described in the embodiments hereinabove, a strong magnetic field is generated through the use of permanent magnet pairs 10 pair, and drive power is generated through interaction of the magnetic field with the electromagnetic coil, whereby it is possible for the motor to generate power in a prescribed driving direction through flow of current in a given direction to the electromagnetic coil. Specifically, with the brushless motors according to the embodiments herein, it is possible to operate the brushless motor without the need for switching of the driving voltage or driving current by the control circuit. Moreover, where the brushless electric machine is implemented as a brushless generator, it will be possible to convert the operation of the generator along a prescribed direction to DC power.

D. Modification Examples

The modes and embodiments set forth herein should not be construed as imposing any particular limitation of the present invention, and it is to be understood that the present invention may be embodied with various changes such as the following without departing from the spirit and scope of the invention.

D1. Modification Example 1

In the embodiments above, DC driving voltage is applied to the electromagnetic coil, but it is acceptable to apply a pulsed voltage to the electromagnetic coil as the driving voltage. Specifically, the motor can be operated in a prescribed driving direction through application of voltage of prescribed polarity to the electromagnetic coil, without changing the polarity of the driving voltage. From the standpoint of the driving current, it will be appreciated that the motor can be operated in a prescribed driving direction through application of driving current in a prescribed direction to the electromagnetic coil, without changing the direction of the driving current. However, continuous application of unchanging DC voltage or DC current to the coil, rather than pulsed voltage or current, has the advantage of simpler control circuit design.

D2. Modification Example 2

In the embodiments above, the mechanical designs and circuit designs of brushless electric machines are described by way of specific examples, but it is possible to employ any of various other configurations as the mechanical and circuit designs in brushless electric machines according to the invention.

D5. Modification Example 3

The present invention is applicable to motors and devices of various kinds such as fan motors, clocks for driving the clock hands, drum type washing machines with single rotation, jet coasters, and vibrating motors. Where the present invention is implemented in a fan motor, the various advantages mentioned previously (low power consumption, low vibration, low noise, minimal rotation irregularities, low heat emission, and long life) will be particularly notable. Such fan motors may be employed, for example, as fan motors for digital display devices, vehicle on-board devices, fuel cell equipped apparatuses such as fuel cell equipped personal computers, fuel cell equipped digital cameras, fuel cell equipped video cameras and fuel cell equipped mobile phones, projectors, and various other devices. The motor of the present invention may also be utilized as a motor for various types of household electric appliances and electronic devices. For example, a motor in accordance with the present invention may be employed as a spindle motor in an optical storage device, magnetic storage device, and polygon mirror drive. Motors in accordance with the present invention may be also employed in a moving body and a robot.

Figure 14:
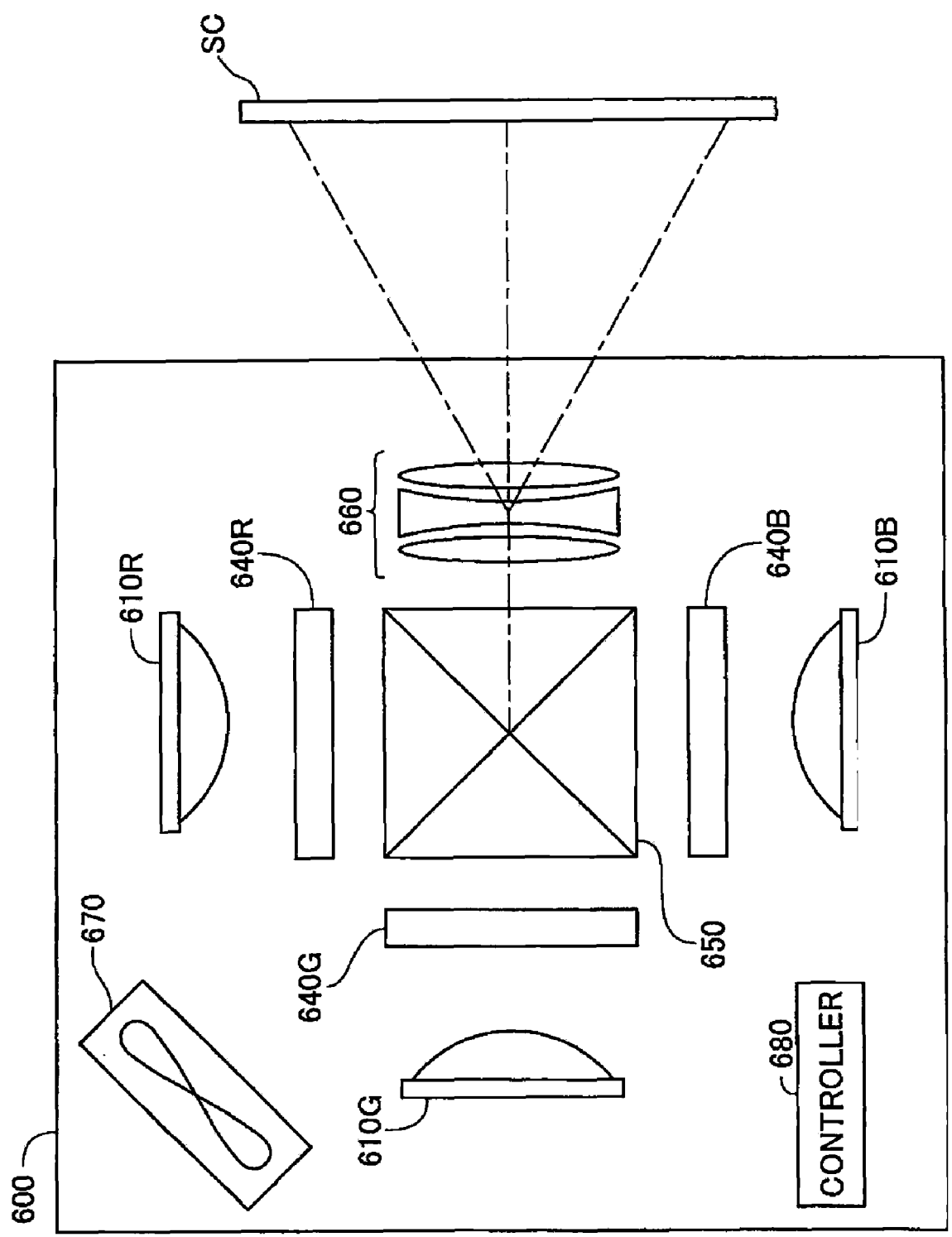
FIG. 14 illustrates a projector utilizing a motor according to an embodiment of the present invention.

FIG. 14 illustrates a projector utilizing a motor according to the present invention. The projector 600 includes three light sources 610R, 610G, 610B for emitting three colored lights of red, green and blue, three liquid crystal light valves 640R, 640G, 640B for modulating the three colored lights, a cross dichroic prism 650 for combining the modulated three colored lights, a projection lens system 660 for projecting the combined colored light toward a screen SC, a cooling fan 670 for cooling the interior of the projector, and a controller 680 for controlling the overall projector 600. Various rotation type brushless motors described above can be used as the motor for driving the cooling fan 670.

Figure 15A:
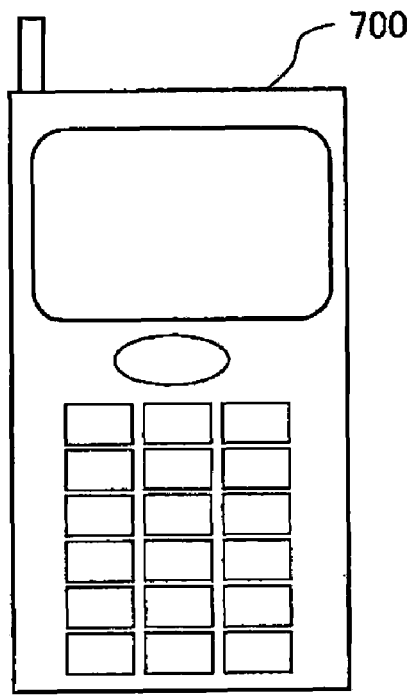
FIGS. 15A-15C illustrate a mobile phone with a fuel cell and a motor according to an embodiment of the present invention.
Figure 15B:
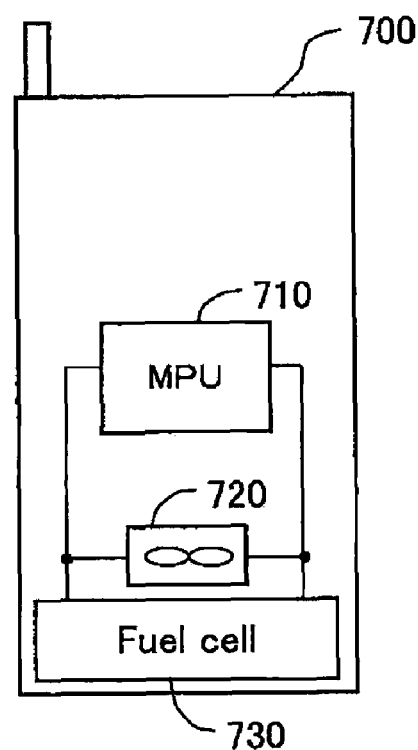
Figure 15C:
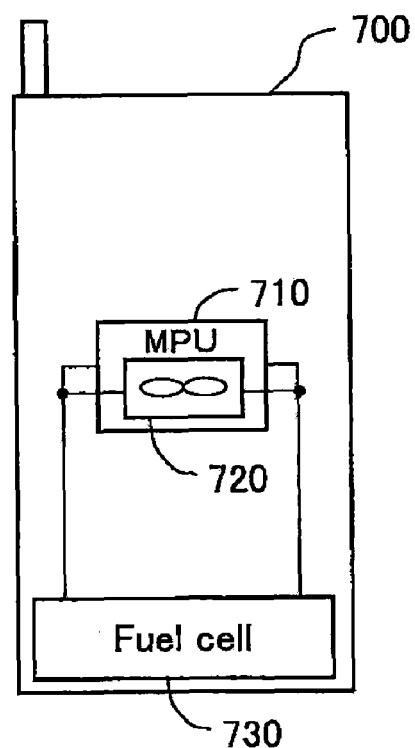

FIGS. 15A-15C illustrate a mobile phone utilizing a motor according to the present invention. FIG. 15A shows the external view of a mobile phone 700, and FIG. 15B shows its exemplary internal configuration. The mobile phone 700 includes a MPU 710 for controlling the operation of the mobile phone 700, a fan 720, and a fuel cell 730. The fuel cell 730 supplies power to the MPU 710 and the fan 720. The fan 720 is installed in order to introduce air into the interior of the mobile phone 700 to supply the air to the fuel cell 730, or to exhaust the interior of the mobile phone 700 of water which will be produced by the fuel cell 730. The fan 720 may be installed over the MPU 710, as illustrated in FIG. 15C, to cool the MPU 710. Various rotation type brushless motors described above can be used as the motor for driving the fan 720.

Figure 16:
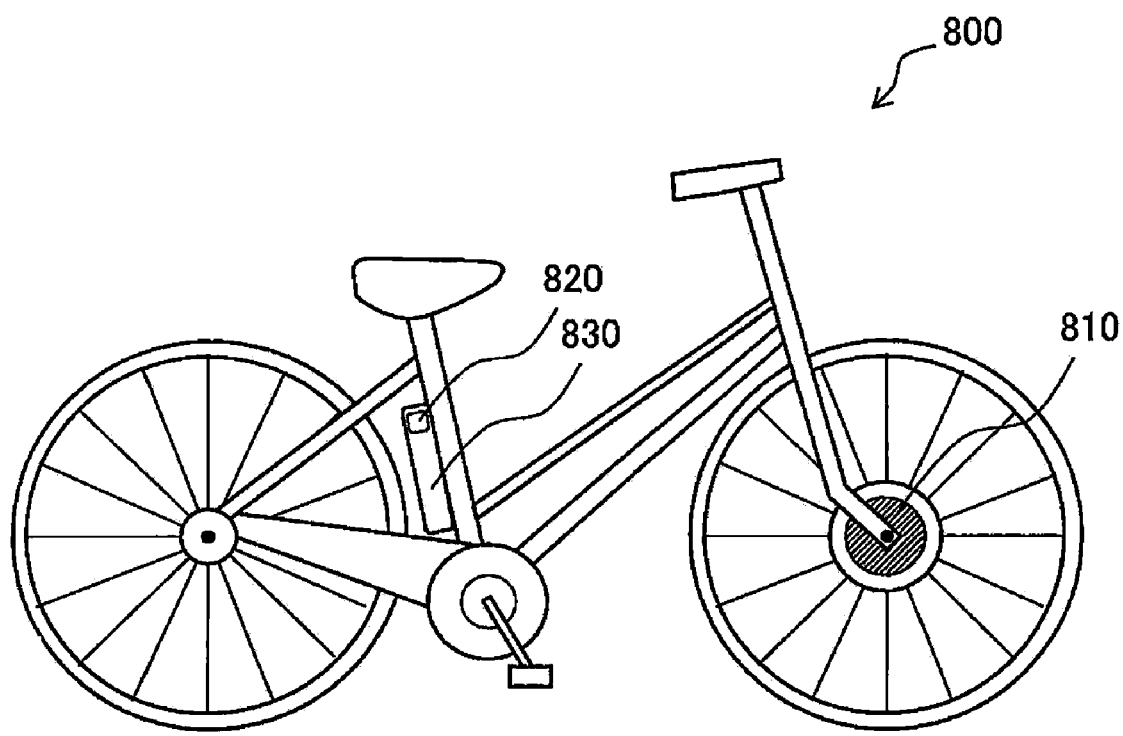
FIG. 16 illustrates an electric bicycle (power-assisted bicycle) as an example of a moving vehicle utilizing a motor/generator according to an embodiment of the present invention.

FIG. 16 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

Figure 17:
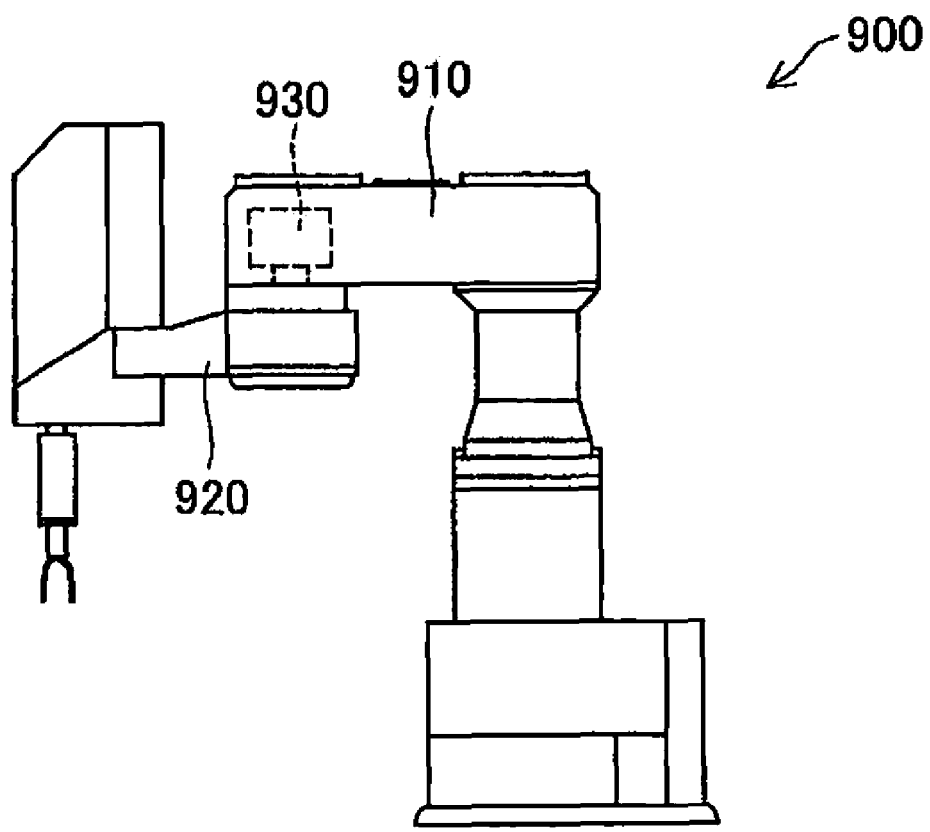
FIG. 17 illustrates an example of a robot utilizing a motor according to an embodiment of the present invention.

FIG. 17 illustrates a robot utilizing a motor according to the present invention. The robot 900 includes a first arm 910, a second arm 920, and a motor 930. The motor 930 is used to horizontally rotate the second arm 920 as a driven member for the motor. Various brushless motors described above can be used as the motor 930.

What is claimed is:

1. A brushless electric machine comprising:
   a first member with a magnet assembly that includes at least one permanent magnet pair, each magnet of the magnet pair having a first magnetic pole and a second magnetic pole, the two magnets of each magnet pair being held such that the first magnetic poles contact one another;
   a second member including a electromagnetic coil, the first and second members being changeable in position relative to one another; and
   a control circuit that controls supply of to the electromagnetic coil or regeneration of power from the electromagnetic coil;
   wherein the permanent magnet pair generates strongest magnetic field along a magnetic field direction lying in a homopolar contact plane at which the first magnetic poles contact one another, and outward from a center of the permanent magnet pair along the magnetic field direction;
   the electromagnetic coil is positioned such that current will flow in a direction intersecting the magnetic field direction; and
   the control circuit performs at least one of:
   (i) drive control to operate the brushless electric machine in a prescribed driving direction, by supplying the electromagnetic coil with driving current in a prescribed first current direction without changing the direction of current supplied to the electromagnetic coil; and
   (ii) regeneration control to regenerate DC power generated by the coil caused by relative movement of the first and second members along a prescribed direction.

2. The brushless electric machine according to claim 1, wherein
   the magnet assembly includes a electromagnetic yoke member contacting the second magnetic pole.

3. The brushless electric machine according to claim 2, wherein
   the magnet assembly includes two or more of the permanent magnet pairs, and the electromagnetic yoke member is disposed between adjacent permanent magnet pairs.

4. The brushless electric machine according to claim 1, wherein
   the first and second members are moveable relatively along a direction perpendicular to the homopolar contact plane.

5. The brushless electric machine according to claim 1, wherein
   the first and second members are moveable relatively along a prescribed direction parallel to the homopolar contact plane.

6. The brushless electric machine according to claim 1, wherein
   in the drive control, the control circuit is capable to operate the brushless electric machine in a reverse direction by supplying the electromagnetic coil with a driving current in a second current direction opposite to the first current direction.

7. The brushless electric machine according to claim 1, wherein the permanent magnet has a recessed portion or a salient portion disposed along a direction intersecting the driving direction.

8. The brushless electric machine according to claim 1, wherein the brushless electric machine is a rotary motor.

9. The brushless electric machine according to claim 1, wherein the brushless electric machine is a linear motor.

10. An apparatus comprising, a brushless electric machine according to claim 1; and a driven member driven by the brushless electric machine.

11. The apparatus according to claim 10, wherein the apparatus is an electronic device.

12. The apparatus according to claim 11, wherein the electronic device is a projector.

13. The apparatus according to claim 10, wherein the apparatus is a fuel cell-powered device including a fuel cell for supplying power to the brushless motor.

14. The apparatus according to claim 10, wherein the apparatus is a robot.

15. The apparatus according to claim 10, wherein the apparatus is a moving body.

* * * * *